(12) United States Patent
Rieder et al.

(10) Patent No.: US 11,277,960 B2
(45) Date of Patent: Mar. 22, 2022

(54) SEED INDUCTOR APPARATUS

(71) Applicant: Bourgault Industries Ltd., St. Brieux (CA)

(72) Inventors: Jami Rieder, St. Brieux (CA); Scot Jagow, St. Brieux (CA); Haydon Rice, St. Brieux (CA)

(73) Assignee: Bourgault Industries Ltd., St. Brieux (CA)

( * ) Notice: Subject to any disclaimer, the term of this patent is extended or adjusted under 35 U.S.C. 154(b) by 269 days.

(21) Appl. No.: 16/558,384

(22) Filed: Sep. 3, 2019

(65) Prior Publication Data

US 2020/0068789 A1 Mar. 5, 2020

(30) Foreign Application Priority Data

Sep. 5, 2018 (CA) .................................. CA 3016544

(51) Int. Cl.
*A01C 7/08* (2006.01)
*A01C 7/10* (2006.01)
*A01C 7/20* (2006.01)

(52) U.S. Cl.
CPC .............. *A01C 7/082* (2013.01); *A01C 7/084* (2013.01); *A01C 7/102* (2013.01); *A01C 7/206* (2013.01)

(58) Field of Classification Search
CPC ......... A01C 7/081; A01C 7/082; A01C 7/084; A01C 7/102
See application file for complete search history.

(56) References Cited

U.S. PATENT DOCUMENTS

| 6,688,244 | B1 | 2/2004 | Meyer et al. |
| 7,182,029 | B2 | 2/2007 | Johnson et al. |
| 8,448,585 | B2 | 5/2013 | Wilhelmi et al. |
| 9,215,841 | B2 | 12/2015 | Johnson et al. |
| 9,439,344 | B2 | 9/2016 | Connors et al. |
| 9,468,141 | B2 * | 10/2016 | Audigie .................. A01C 7/20 |

(Continued)

FOREIGN PATENT DOCUMENTS

WO WO-2020214077 A1 * 10/2020 ............. A01C 7/081

OTHER PUBLICATIONS

Canadian Office Action dated Nov. 26, 2019 for Application No. CA 3,016,544, 7 pgs.

*Primary Examiner* — Thomas B Will
*Assistant Examiner* — Ian A Normile
(74) *Attorney, Agent, or Firm* — Frost Brown Todd LLC; Nicole M. Tepe

(57) ABSTRACT

An inductor apparatus includes an inductor assembly mounted under a seed container such that seeds flow into a reservoir. An air conduit carrying pressurized air extends along the reservoir. Seed channels extend from an inlet located above a pickup air opening in the air conduit to an outlet, and a bypass channel extends downward from each seed channel through an upper wall of the air conduit. A pickup air stream flowing out the pickup air opening forms a seed air stream entrained with seeds flowing into each seed channel inlet and a bypass air stream flows from the air conduit through each bypass channel into each seed channel and the combined seed and bypass air streams flow out the seed channel outlets. The seed channel outlets can be arranged along each side of the inductor assembly, and the rate of flow of the bypass air stream can be adjusted.

14 Claims, 11 Drawing Sheets

(56) References Cited

U.S. PATENT DOCUMENTS

| | | |
|---|---|---|
| 10,070,576 B2 | 9/2018 | Swanson |
| 2016/0100518 A1* | 4/2016 | Johnson ................. A01C 7/084 406/127 |
| 2017/0086355 A1 | 3/2017 | Borkgren et al. |
| 2017/0318737 A1 | 11/2017 | Gilstring |
| 2019/0090416 A1* | 3/2019 | Schembri ............... A01C 19/02 |
| 2020/0359554 A1* | 11/2020 | Lanyon ................. A01C 7/081 |

* cited by examiner

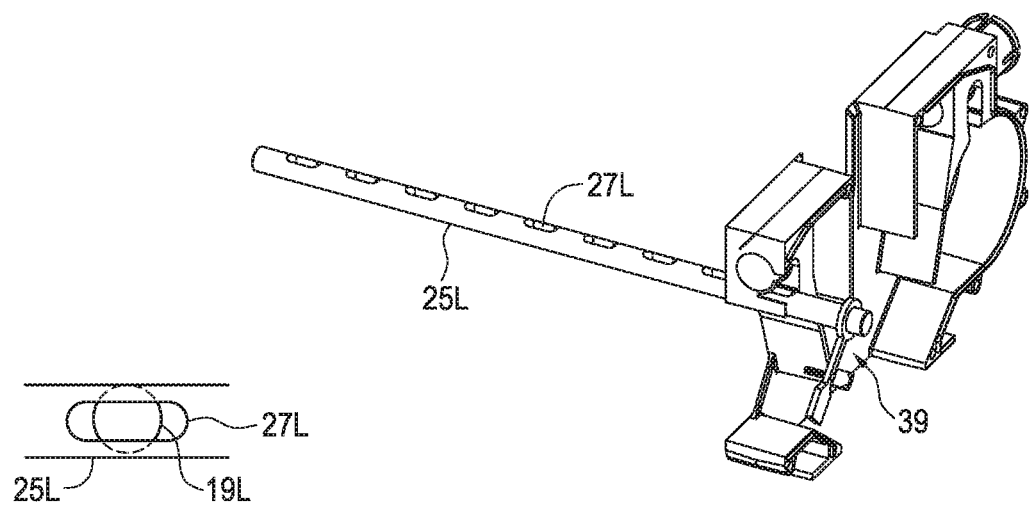
FIG. 12A   FIG. 12
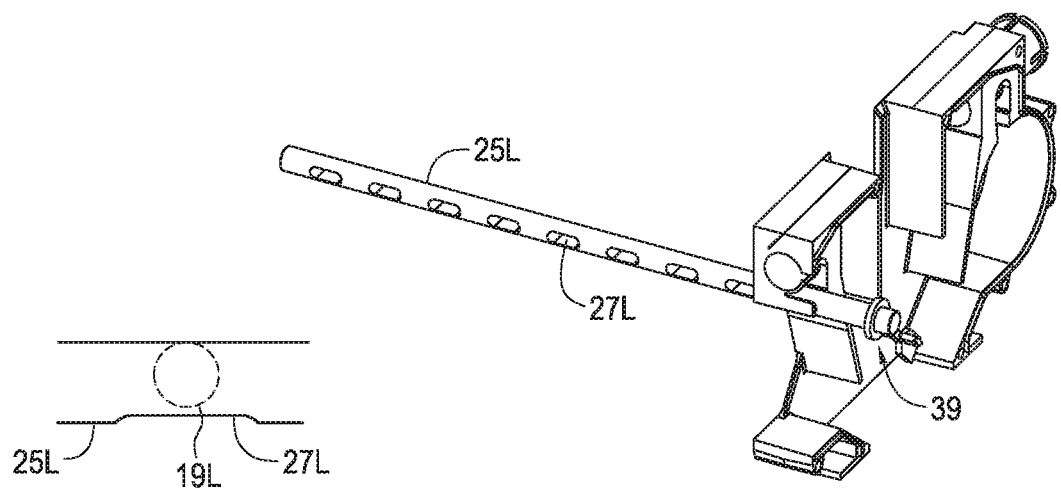
FIG. 13A   FIG. 13
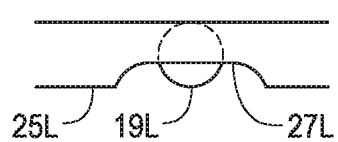 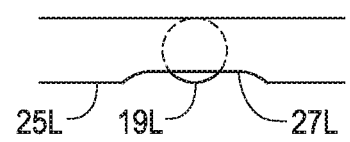
FIG. 14A   FIG. 14B

SEED INDUCTOR APPARATUS

CROSS-REFERENCE TO RELATED APPLICATION

This application claims priority to and benefit of CA Serial No. 3,016,544, filed Sep. 5, 2018, the contents of which are incorporated by reference in their entirety for all purposes.

FIELD OF THE INVENTION

This disclosure relates to the field of agricultural seeding implements and in particular an inductor system for air seeders to deliver seeds from a storage container to a plurality of seed destinations.

BACKGROUND

Agricultural seeding implements for crops such as corn, soybeans, and the like typically include a singulating meter that is operative to dispense seeds individually into a furrow formed in the soil surface by a furrow opener. In the past each singulating meter included a seed container mounted above each singulating meter to supply seed to the meter by gravity. Early designs required each seed container to be filled individually, a time consuming process. More recently inductor systems have been developed where an air stream carries seeds from a single nurse tank to the seed container above each meter, or to a small seed container defined in the singulating meter itself.

The metering function is carried out by the singulating meters, and the inductor systems are only required to ensure that a supply of seeds is maintained available to each singulating meter. Thus in a typical inductor system seeds flow from the nurse tank down into a reservoir and an air stream directed into the reservoir picks up seeds and carries them through a plurality of seed conduits to a like plurality of seed containers, each corresponding to a singulating meter. The seed containers include an air release assembly, such as a screen.

As seeds entrained in an air stream move into a seed container, the air is released through the screen and the seeds drop into the seed container. The level of seeds in the seed container rises as the seed container fills, and moves up along the screen reducing the area of screen available for the air to pass through such that pressure builds in the seed container and eventually the pressure is such that the volume and velocity of the air stream is reduced to a point where the air stream no longer is sufficient to pick up seeds from the reservoir. Seeds that are in the seed conduit fall out of the air stream as well. The level of seeds in the seed container falls as the seeds are metered out by the corresponding singulating meter, exposing an increasing area of screen, and the volume and velocity of the air stream increases to a point where same is sufficient to again pick up seeds from the reservoir and also pick up those seeds that have fallen to the bottom of the seed conduit. U.S. Pat. No. 6,688,244 to Meyer et al. and United States Published Patent Application Number 2017/0318737 of Gilstring for example disclose inductor systems.

To reduce the possibility of plugging the seed conduits, it is also known to divide the air stream into a pick-up portion that passes into the reservoir to pick up seeds such that the pick-portion of the air stream enters the seed conduit entrained with seeds, and a bypass portion that passes directly into the seed conduit and carries no seeds. U.S. Pat. No. 7,182,029 to Johnson et al. and U.S. Pat. No. 8,448,585 to Wilhelmi et al. disclose inductor systems that include bypass airflow.

Since the shape, weight and size of seeds can vary greatly, airflow requirements will vary significantly depending on the kinds of seeds being sown. Airflow requirements can also vary significantly from one seed conduit to another. For example in a typical seeding implement some seed containers in the middle portion of the implement will be quite close to the nurse tank, requiring only a relatively short seed conduit, while others near the outer edges of the implement will require a much longer seed conduit, and a correspondingly higher airflow. The arrangement of these longer seed conduits with elevation changes creating high points and low points can vary the airflow requirements as well. U.S. Pat. No. 9,215,841 to Johnson et al. discloses an airflow control device in communication with the inductor system and configured to control the airflow through the air bypass channel.

United States Published Patent Application Number 2017/0086355 of Borkgren et al. discloses a seed distribution system where seeds are metered and conveyed from the air seeder tank to a remote pick-up assembly comprising a housing with a plurality of outlets arrayed along opposite upright side walls of the housing, each outlet connected to a seed conduit to carry seeds to downstream seed containers. The seeds and air stream are separated at an inlet to the housing, and the seeds fall down an interior of the housing and the air stream is redirected into the housing where same picks-up and entrains the seeds again and passes along each seed conduit.

BRIEF SUMMARY

The present disclosure provides an inductor apparatus for a seeding implement that overcomes problems in the prior art.

In a first embodiment the present disclosure provides an inductor apparatus for an agricultural seeding implement. The apparatus comprises a storage container for seeds, and an inductor assembly mounted under the storage container such that seeds from the storage container flow into a reservoir defined by the inductor assembly. The inductor assembly defines an air conduit extending along the reservoir and a pressurized air source directing a pressurized air stream into the air conduit, and a pickup air opening in the air conduit is configured to direct a pickup air stream into the reservoir. The inductor assembly defines a plurality of seed channels, each seed channel extending across a top side of the air conduit from a seed channel inlet located above the pickup air opening to a seed channel outlet, and a bypass channel extends downward from each seed channel through an upper wall of the air conduit. In operation the pickup air stream picks up seeds flowing into the reservoir and forms a seed air stream entrained with seeds flowing into each seed channel inlet and a bypass air stream flows from the air conduit through each bypass channel into each seed channel and the combined seed air streams and bypass air streams flow out the seed channel outlets.

In a second embodiment the present disclosure provides an inductor apparatus for an agricultural seeding implement. The apparatus comprises a storage container for seeds, and an inductor assembly mounted under the storage container such that seeds from the storage container flow into a reservoir defined by the inductor assembly. The inductor assembly defines right and left air conduits extending along corresponding right and left sides of the reservoir and a pressurized air source directs a pressurized air stream into the right and left air conduits. Right and left pickup air openings in the corresponding right and left air conduits are configured to direct right and left pickup air streams into the reservoir. The inductor assembly defines a plurality of right seed channels, each right seed channel extending across a top side of the right air conduit from a right seed channel inlet located above the right pickup air opening to a right seed channel outlet located above a right side of the right air conduit, and defines a plurality of left seed channels, each left seed channel extending across a top side of the left air conduit from a left seed channel inlet located above the left pickup air opening to a left seed channel outlet located above a left side of the left air conduit. A right bypass channel extends downward from each right seed channel through an upper wall of the right air conduit, and a left bypass channel extends downward from each left seed channel through an upper wall of the left air conduit. In operation the right pickup air stream picks up seeds flowing into the reservoir and forms a right seed air stream entrained with seeds flowing into each right seed channel inlet and a right bypass air stream flows from the right air conduit through the right bypass channels into each right seed channel and the combined right seed air streams and right bypass air streams flow out the right seed channel outlets, and the left pickup air stream picks up seeds flowing into the reservoir and forms a left seed air stream entrained with seeds flowing into each left seed channel inlet and a left bypass air stream flows from the left air conduit through the left bypass channels into each left seed channel and the combined left seed air streams and left bypass air streams flow out the left seed channel outlets.

In a third embodiment the present disclosure provides an inductor apparatus for an agricultural seeding implement. The apparatus comprises a storage container for seeds, and an inductor assembly mounted under the storage container such that seeds from the storage container flow into a reservoir defined by the inductor assembly. The inductor assembly defines an air conduit extending along a middle of the reservoir and a pressurized air source directs a pressurized air stream into the air conduit. Right and left pickup air openings in corresponding right and left lower sides of the air conduit are configured to direct right and left pickup air streams into corresponding right and left sides of a floor of the reservoir. The inductor assembly defines a plurality of right seed channels, each right seed channel extending substantially perpendicular to the air conduit and sloping upward from a right seed channel inlet located above the right pickup air opening to a right seed channel outlet located in an upper right portion of the inductor assembly. The inductor assembly defines a plurality of left seed channels, each left seed channel extending substantially perpendicular to the air conduit and sloping upward from a left seed channel inlet located above the left pickup air opening to a left seed channel outlet located in an upper left portion of the inductor assembly. A right bypass channel extends downward from each right seed channel and through a lower right wall of the air conduit below the right pickup air opening, and a left bypass channel extends downward from each left seed channel and through a lower left wall of the air conduit below the left pickup air opening. In operation the right pickup air stream picks up seeds flowing into the reservoir and forms a right seed air stream entrained with seeds flowing into each right seed channel inlet and a right bypass air stream flows from the air conduit through the right bypass channel into each right seed channel and the combined right seed air streams and right bypass air streams flow out the right seed channel outlets, and the left pickup air stream picks up seeds flowing into the reservoir and forms a left seed air stream entrained with seeds flowing into each left seed channel inlet and a left bypass air stream flows from the air conduit through the left bypass channels into each left seed channel and the combined left seed air streams and left bypass air streams flow out the left seed channel outlets.

In a fourth embodiment the present disclosure provides an inductor apparatus for an agricultural seeding implement. The apparatus comprises a storage container for seeds, and an inductor assembly mounted under the storage container such that seeds from the storage container flow into a reservoir defined by the inductor assembly. The inductor assembly defines an air conduit and a pressurized air source directs a pressurized air stream into the air conduit. A pickup air opening in the air conduit is configured to direct a pickup air stream into the reservoir. The inductor assembly defines a plurality of seed channels, each seed channel extending from a seed channel inlet to a seed channel outlet, and a bypass channel extends from each seed channel and through a wall of the air conduit. The bypass channels are aligned and the inductor assembly defines a rod channel extending from an exterior of the inductor assembly through the inductor assembly, and each bypass channel passes through the rod channel. In operation the pickup air stream picks up seeds flowing into the reservoir and forms a seed air stream entrained with seeds flowing into each seed channel inlet and a bypass air stream flows from the air conduit through the bypass channel into each seed channel and the combined seed air streams and bypass air streams flow out the seed channel outlets. A bypass rod extends through the rod channel, the bypass rod defining a plurality of rod apertures, the bypass rod configured such that the bypass rod is movable to a position where each bypass channel is substantially aligned with a rod aperture, and moving the rod apertures with respect to the bypass channels changes the rate of flow of the bypass air streams.

The inductor apparatus of the present disclosure provides a compact inductor assembly with bypass channels operative to provide bypass air streams directly to the seed channels. The rate of flow of the bypass air streams can be adjusted to suit various kinds of seeds, flow rates, and the like. The rate of flow of the bypass air stream for any individual delivery conduit can be adjusted to a level that is different than the rate of flow in adjacent delivery conduits.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

FIG. 4 is an enlarged sectional view of the right bypass channel shown in

FIG. 3;

FIG. 12 is a front perspective view of the left bypass rod inserted into a portion of the rod channel defined by one of the inductor modules and oriented in an open position;

FIG. 12A schematically illustrates the relative positions of the bypass channels and rod apertures with the bypass rod in the position of FIG. 12;

FIG. 13 is a front perspective view of the left bypass rod as in FIG. 12 rotated to a closed position;

FIG. 13A schematically illustrates the relative positions of the bypass channels and rod apertures with the bypass rod in the position of FIG. 13;

FIG. 14A schematically illustrates the relative positions of the bypass channels and rod apertures with the bypass rod in a first bypass position;

FIG. 14B schematically illustrates the relative positions of the bypass channels and rod apertures with the bypass rod in a second bypass position;

DETAILED DESCRIPTION OF THE ILLUSTRATED EMBODIMENTS

Figure 1:
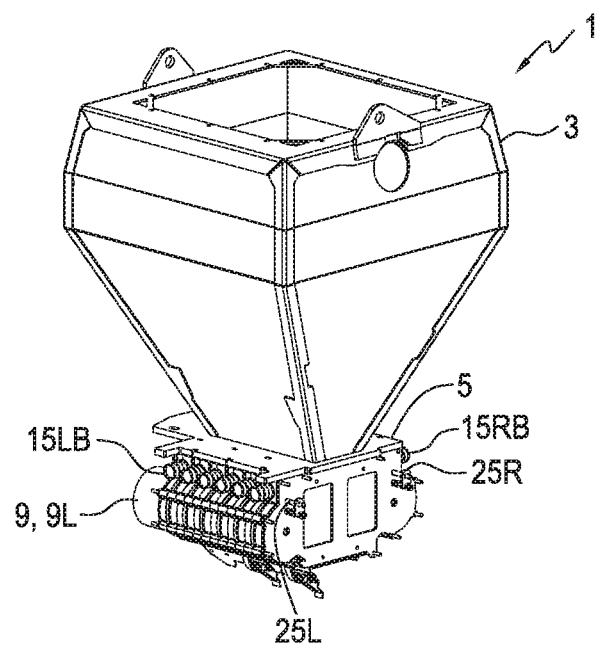
FIG. 1 is a schematic front perspective view of an embodiment of the inductor apparatus of the present disclosure.
Figure 2:
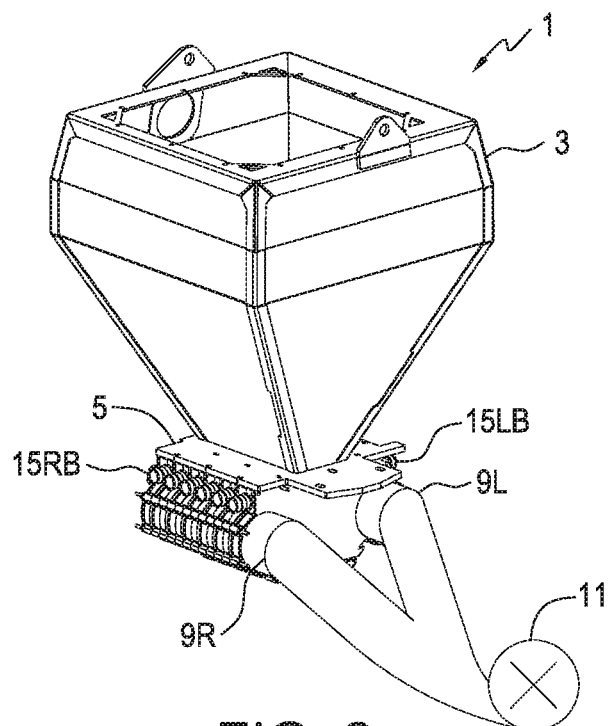
FIG. 2 is a schematic rear perspective view of the embodiment of FIG. 1.
Figure 3:
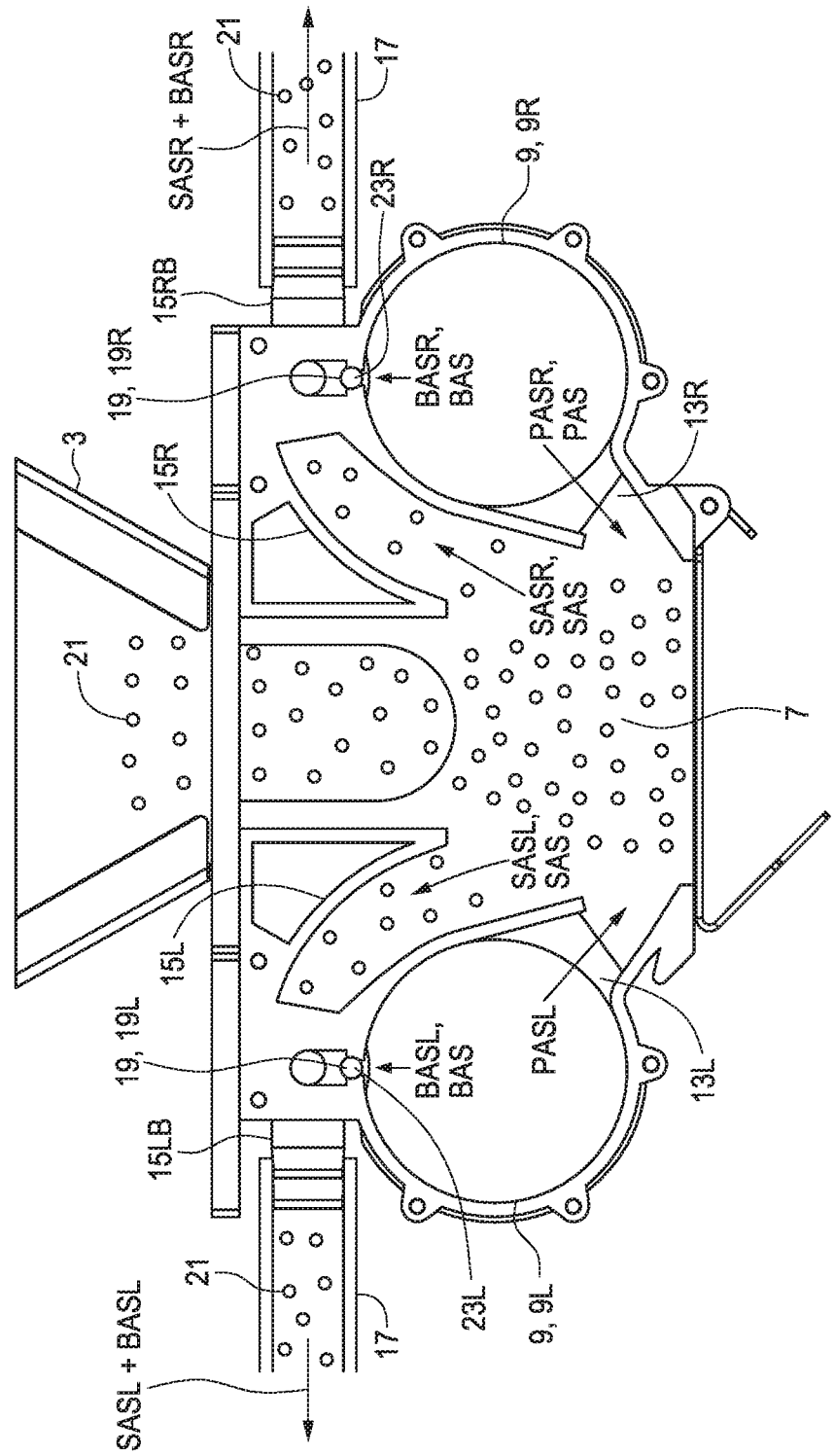
FIG. 3 is a front sectional view of the embodiment of FIG. 1.

FIGS. 1 and 2 illustrate front and rear perspective views of an embodiment of an inductor apparatus 1 of the present disclosure for an agricultural seeding implement, typically a seeding implement with singulating meters as are known in the art where seeds are carried in a storage container and transferred to the singulating meters as needed. The apparatus 1 comprises a storage container 3 for holding a supply of seeds. An inductor assembly 5, shown in a sectional view in FIG. 3, is mounted under the storage container 3 such that seeds from the storage container 3 flow into a reservoir 7 defined by the inductor assembly 5.

The inductor assembly 5 defines right and left air conduits 9R, 9L extending along corresponding right and left sides of the reservoir 7 and a pressurized air source directs a pressurized air stream into the air conduits 9. The pressurized air source will typically be provided by one or more fans 11.

Right and left pickup air openings 13R, 13L in the corresponding right and left air conduits 9R, 9L are configured to direct right and left pickup air streams PASR, PASL into the reservoir 7. In the illustrated apparatus 1 the pickup air streams PASR, PASL are directed into the lower portion of the reservoir 7 toward the floor of the reservoir.

The inductor assembly 5 defines a plurality of right seed channels 15R, each right seed channel 15R extending across a top side of the right air conduit 9R from a right seed channel inlet 15RA located above the right pickup air opening 13R to a right seed channel outlet 15RB located above a right side of the right air conduit 9R.

In a symmetrical fashion the inductor assembly 5 defines a plurality of left seed channels 15L, each left seed channel 15L extending across a top side of the left air conduit 9L from a left seed channel inlet 15LA located above the left pickup air opening 13L to a left seed channel outlet 15LB located above a left side of the left air conduit 9L.

The right and left seed channel outlets 15RB, 15LB are arranged in alignment in a row along a length of the respective right and left air conduits 9R, 9L and extend in opposite directions from the inductor assembly 5. Delivery conduits 17 can then be connected to the seed channel outlets 15RB, 15LB to carry seeds in opposite directions away from the inductor assembly. In a typical inductor assembly 5 the number of right seed channels 15R is equal to the number of left seed channels 15L such that air flows in each direction right and left are generally equal and balanced.

The disclosed mirrored or symmetrical layout takes reduced space compared to inductor assemblies where the seed channel outlets are along the same side, resulting in a long inductor assembly. The reduced length reduces the time for cleanout as it concentrates the seeds to a smaller more centralized area. The centralized area also improves operation on side slopes when there is little seed left in the storage container 3 compared to a longer inductor assembly where there would be a greater chance of the uphill seed channels being starved. It is contemplated that the smaller length and volume of the interior of the inductor assembly 5 can reduce variations in air pressure from one part of the interior to another.

A right bypass channel 19R extends downward from each right seed channel 15R through an upper wall of the right air conduit 9R, and similarly a left bypass channel 19L extends downward from each left seed channel 15L through an upper wall of the left air conduit 9L.

In operation the right and left pickup air streams PASR, PASL pick up seeds 21 flowing into the reservoir 7 and form corresponding right and left seed air streams SASR, SASL entrained with seeds flowing into each of the corresponding right and left seed channel inlets 15RA, 15LA. At the same time, once pressurized air is present in the air conduits 9, right and left bypass air streams BASR, BASL flow from the corresponding right and left air conduits 9R, 9L through the corresponding right and left bypass channels 19R, 19L into a middle portion of each of the corresponding right and left seed channels 15R, 15L.

Figure 4:
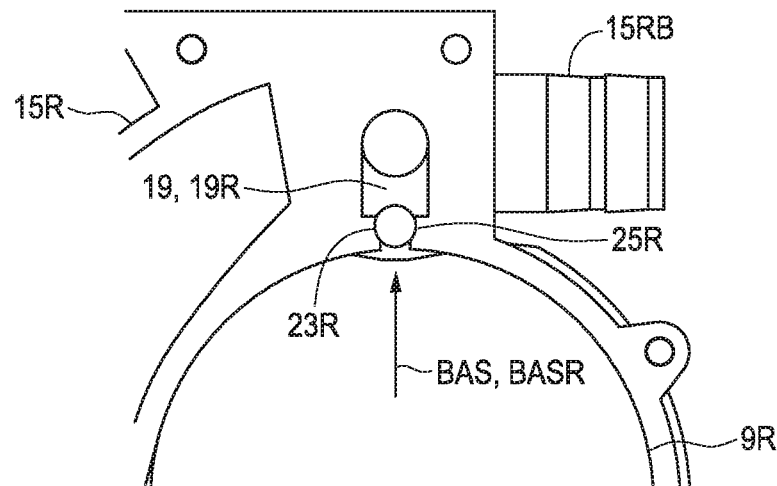

The combined right seed air streams SASR and right bypass air streams BASR flow out the right seed channel outlets 15RB, and the combined left seed air streams SASL and left bypass air streams BASL flow out the left seed channel outlets 15LB. In the illustrated inductor assembly 5 the rate of flow of the right and left bypass air streams BASR, BASL through the corresponding right and left bypass channels 19R, 19L is adjustable. FIG. 4 is an expanded view of a portion of FIG. 3 showing the upper portion of the right air conduit 9R and the bypass channel 19R.

Figure 6:
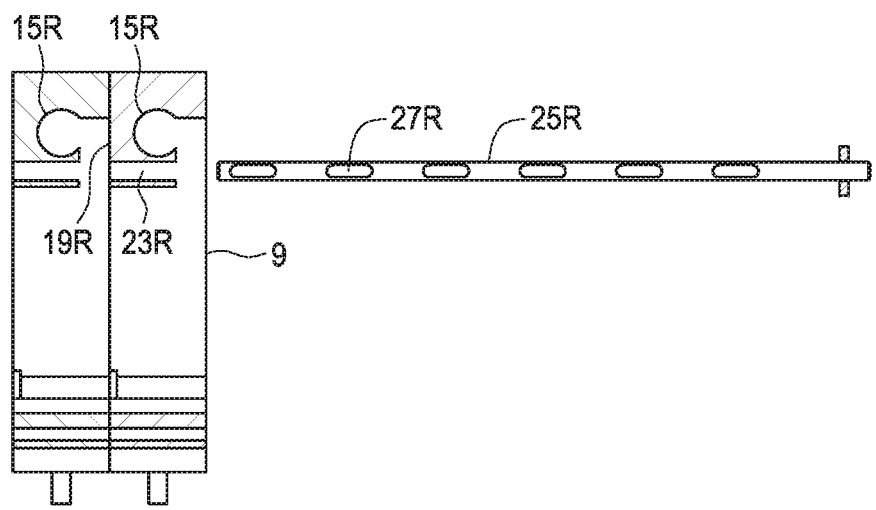
FIG. 6 is a schematic sectional view of the right air conduit, right seed channels, the right rod channel, and the right bypass rod of the embodiment of FIG. 1.

The right bypass channels 19R are aligned, and the inductor assembly 5 defines a right rod channel 23R extending from an exterior of the inductor assembly 5 through inductor assembly 5 between the right air conduit 9R and the right seed channels 15R. The right bypass channels 19R pass through the right rod channel 23R. FIG. 6 schematically illustrates a longitudinal section of the right rod channel 23R showing the right bypass channels 19R passing through the right rod channel from side portions of the right seed channels 15R to the right air conduit 9R.

Figure 5:
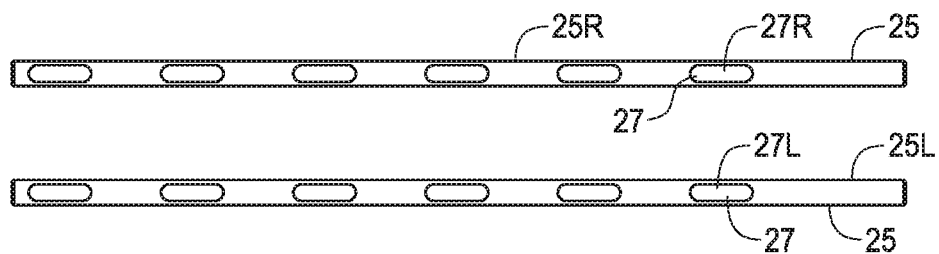
FIG. 5 is a top view of the right and left bypass rods of the embodiment of FIG. 1.
Figure 7:
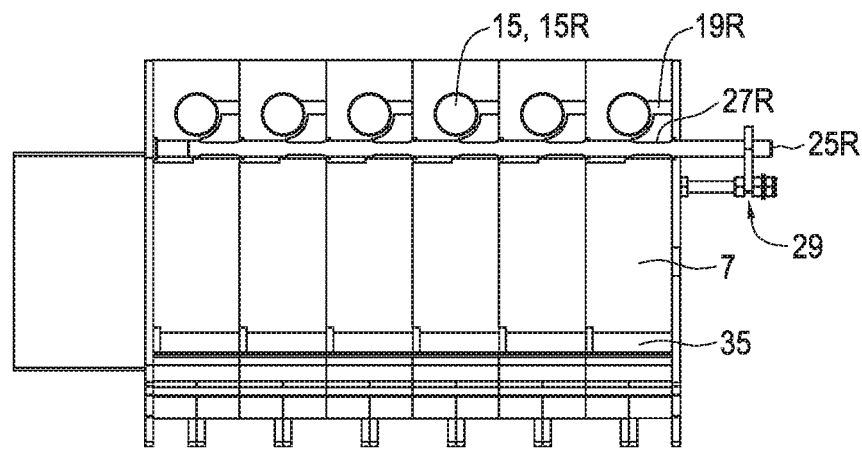
FIG. 7 is a sectional side view of the embodiment of FIG. 1 showing the bypass rod in an open position.
Figure 8:
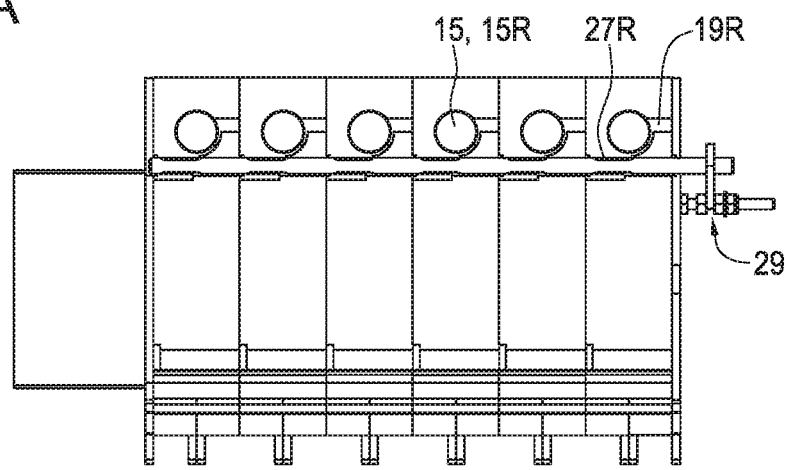
FIG. 8 is a sectional side view of the embodiment of FIG. 1 showing the bypass rod in a closed position.

A right bypass rod 25R, shown in FIG. 5, extends through the right rod channel 23R. The right bypass rod 25R defines a plurality of right rod apertures 27R, where each right bypass channel 19R corresponds to a right rod aperture 27R as shown in FIGS. 7 and 8. The right bypass rod 25R is configured such that the right bypass rod 25R is movable to a position where each right bypass channel 19R is substantially aligned with a corresponding right rod aperture 27R.

Moving the right bypass rod 25R moves the right rod apertures 27R with respect to the right bypass channels 19R and changes the effective size of the right bypass channels 19R and changes the rate of flow of the right bypass air streams BASR. The right bypass rod 25R is movable in the right rod channel 23R but substantially fills the right rod channel 23R so that air flow through the right bypass channels 19R around the right bypass rod 25R is substantially prevented, and the rate of flow of the right bypass air streams BASR is effectively controlled by the relative positions of the right rod apertures 27R with respect to the right bypass channels 19R.

Figure 7A:
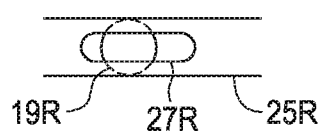
FIG. 7A schematically illustrates the relative positions of the bypass channels and rod apertures with the bypass rod in the position of FIG. 7.
Figure 8A:
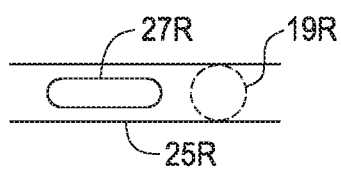
FIG. 8A schematically illustrates the relative positions of the bypass channels and rod apertures with the bypass rod in the position of FIG. 8.

FIG. 7 shows the bypass rod 25R in a fully open position where the bypass channels 19R are aligned with the rod apertures 27R as schematically illustrated in FIG. 7A. FIG. 8 shows the bypass rod 25R in a fully closed position where the bypass channels 19R are not in alignment with the rod apertures 27R but are fully blocked by the bypass rod and closed as schematically illustrated in FIG. 8A. In FIGS. 7 and 8 the bypass rod 25R is moved linearly in the rod channel 23R between the fully open and the fully closed positions.

Figure 9A:
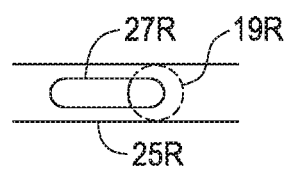
FIG. 9A schematically illustrates the relative positions of the bypass channels and rod apertures with the bypass rod in a first bypass position.
Figure 9B:
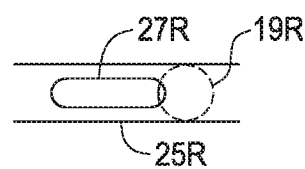
FIG. 9B schematically illustrates the relative positions of the bypass channels and rod apertures with the bypass rod in a second bypass position.

A linear rod lock 29 can be used to lock the bypass rod 25R in any desired position between the fully open and fully closed positions to provide a desired rate of flow of the right bypass air streams BASR. The right bypass rod 25R then is movable from a first bypass position schematically illustrated in FIG. 9A, where each right bypass channel 19R is aligned to a first degree with the corresponding right rod aperture 27R allowing the right bypass air stream BASR to flow at a first rate, to a second bypass position schematically illustrated in FIG. 9B, where each right bypass channel 19R is aligned to a second lesser degree with the corresponding right rod aperture 27R allowing the right bypass air stream BASR to flow at a second rate that is less than the first rate as the effective size of the bypass channel 19R is reduced.

The left side of the inductor assembly 5 is arranged in the same manner. The left bypass channels 19L are aligned, and the inductor assembly 5 defines a left rod channel 23L extending from an exterior of the inductor assembly 5 through the left bypass channels 19L between the left air conduit 9L and the left seed channels 15L. A left bypass rod 25L extends through the left rod channel 23L, and defines a plurality of left rod apertures 27L, where each left bypass channel 19L corresponds to a left rod aperture 27L, and moving the left rod apertures 27L with respect to the left bypass channels 19L changes the effective size of the left bypass channels 19L and changes the rate of flow of the left bypass air streams BASL.

Figure 10:
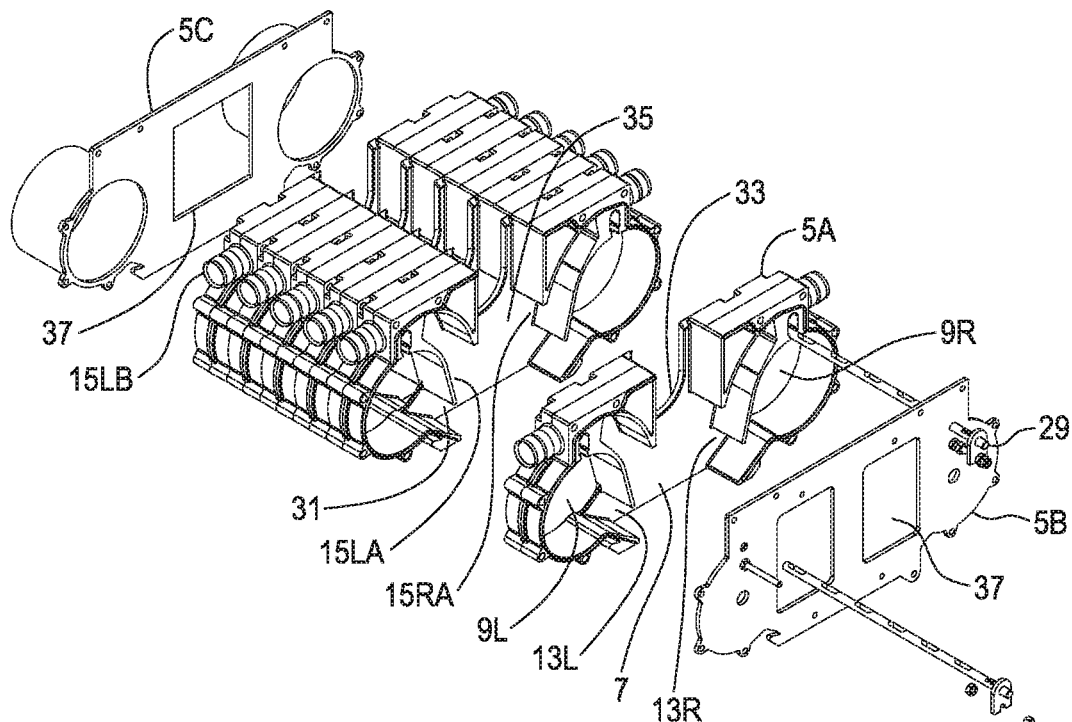
FIG. 10 is a front perspective exploded view of the embodiment of FIG. 1.
Figure 11:
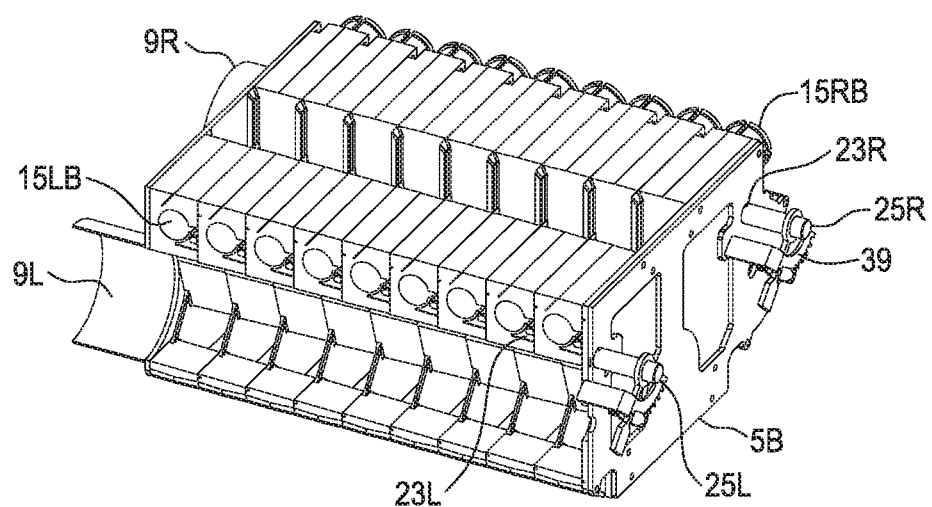
FIG. 11 is a front perspective assembled view of the embodiment of FIG. 1.
Figure 15:
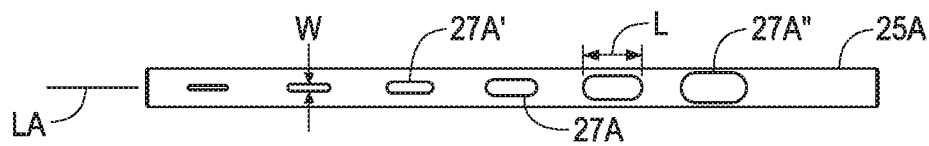
FIG. 15 is a top view of a bypass rod where the length of the rod apertures is constant and the width of the rod apertures varies along the bypass rod.
Figure 15A:
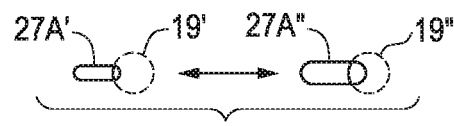
FIG. 15A is a schematic view of the relative position of a first bypass channel with a corresponding first rod aperture of the bypass rod shown in FIG. 15 at a first location on the bypass rod, and the relative position of a second bypass channel with a corresponding second rod aperture at a second location on the bypass rod.
Figure 16:
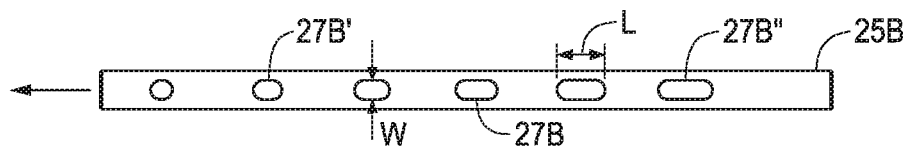
FIG. 16 is a top view of a bypass rod where the length of the rod apertures varies along the bypass rod, and the width of the rod apertures is constant.
Figure 16A:
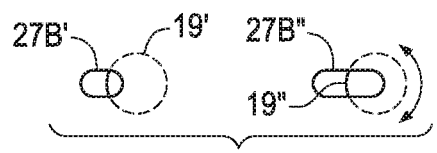
FIG. 16A is a schematic view of the relative position of a first bypass channel with a corresponding first rod aperture of the bypass rod shown in FIG. 16 at a first location on the bypass rod, and the relative position of a second bypass channel with a corresponding second rod aperture at a second location on the bypass rod.
Figure 17:
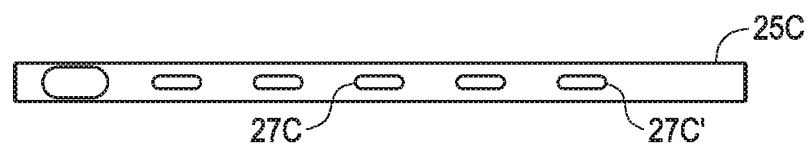
FIG. 17 is a top view of bypass rod where one rod aperture is larger than the others.
Figure 18:
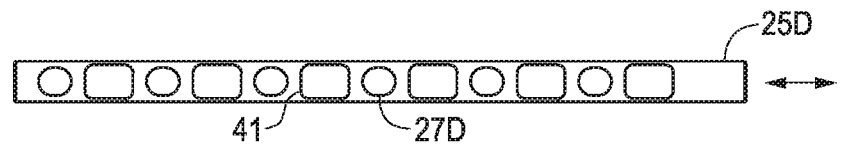
FIG. 18 is a top view of a bypass rod that defines clean out apertures in addition to rod apertures.
Figure 18A:
FIG. 18A is a schematic view of the relative position of a bypass channel with a corresponding rod aperture of the bypass rod shown in FIG. 18 where the bypass rod is in a bypass position.
Figure 18B:
FIG. 18B is a schematic view of the relative position of a bypass channel with a corresponding clean out aperture of the bypass rod shown in FIG. 18 where the bypass rod is in a clean out position.
Figure 19:
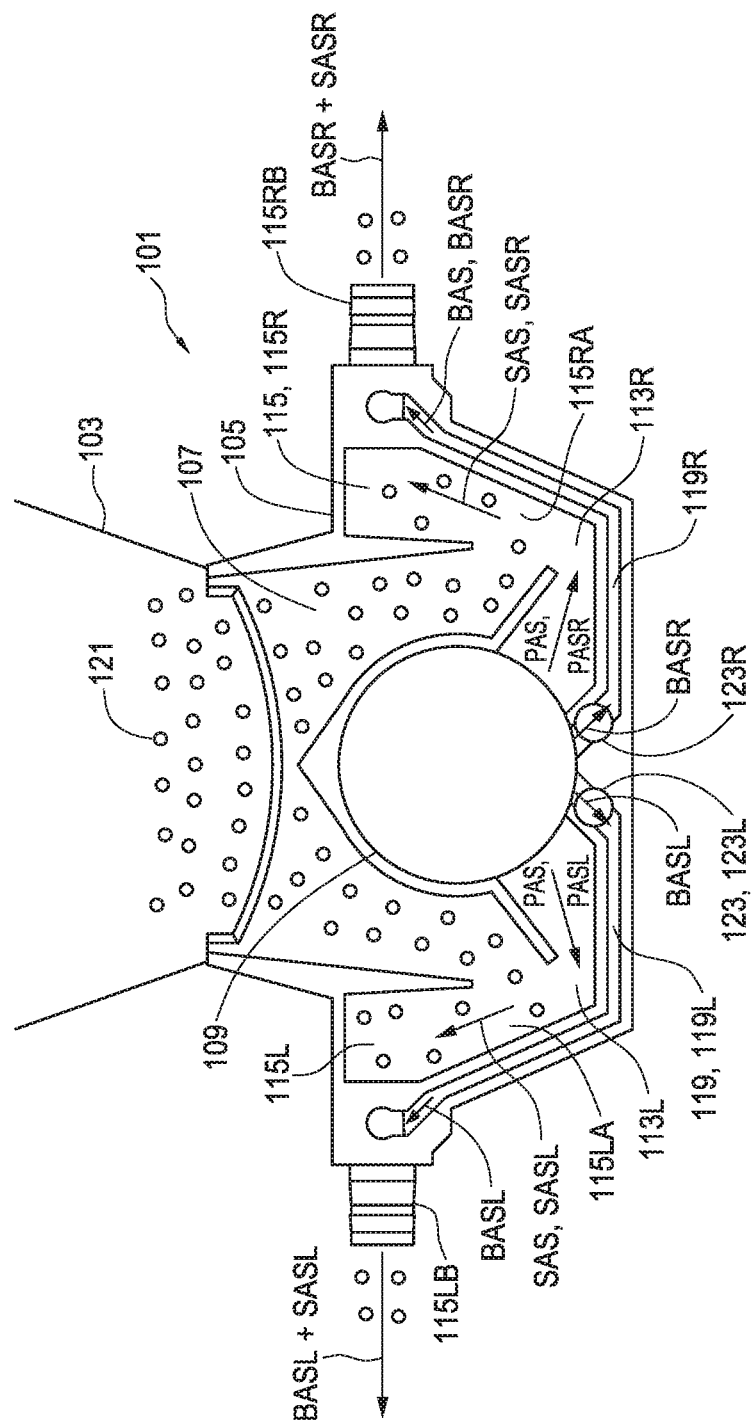
FIG. 19 is a front sectional view of an alternate embodiment of the inductor apparatus of the present disclosure.
Figure 20:
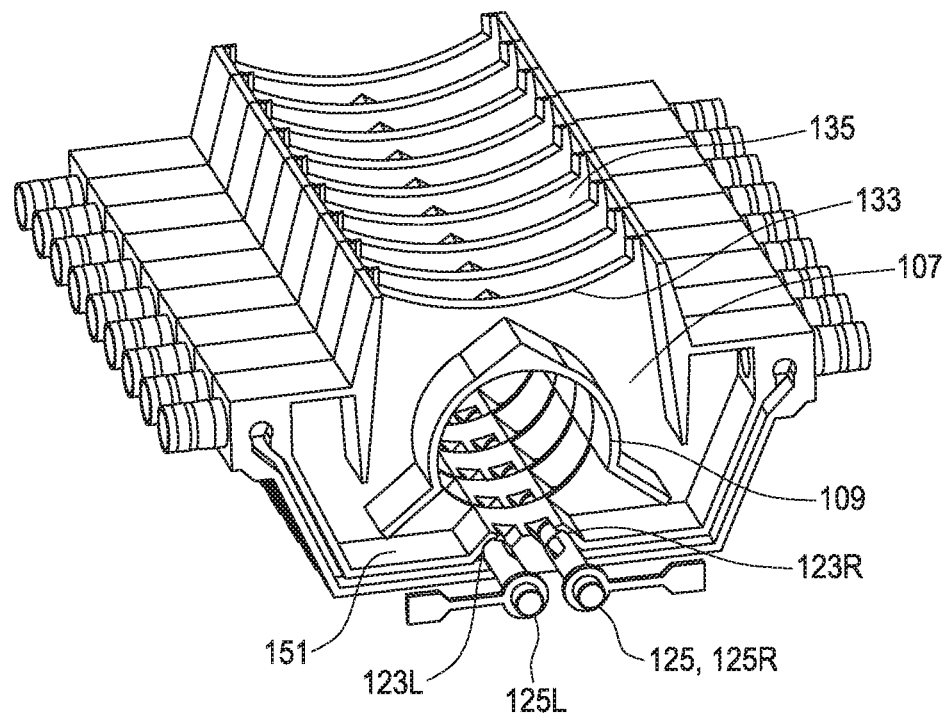
FIG. 20 is a front perspective view of the embodiment of FIG. 19 with the end plate removed.
Figure 21:
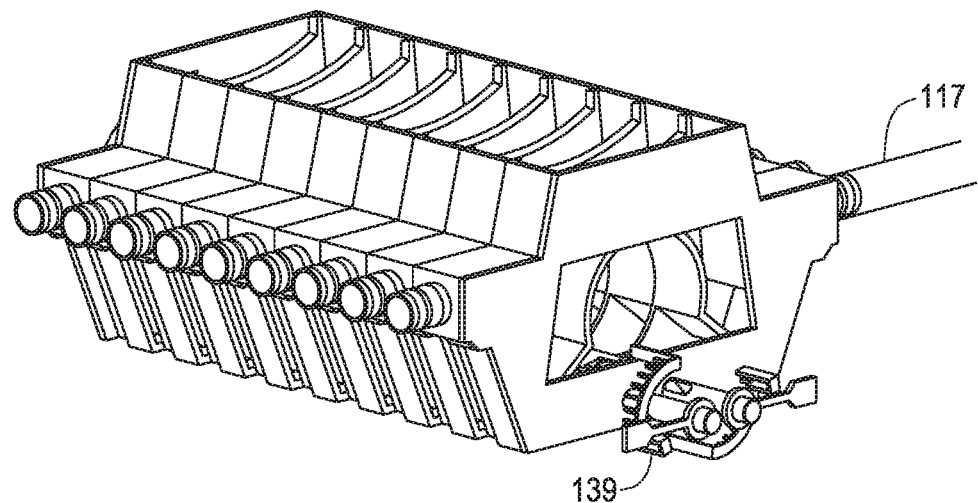
FIG. 21 is a front perspective view of the embodiment of FIG. 19 with the end plate installed.
Figure 22:
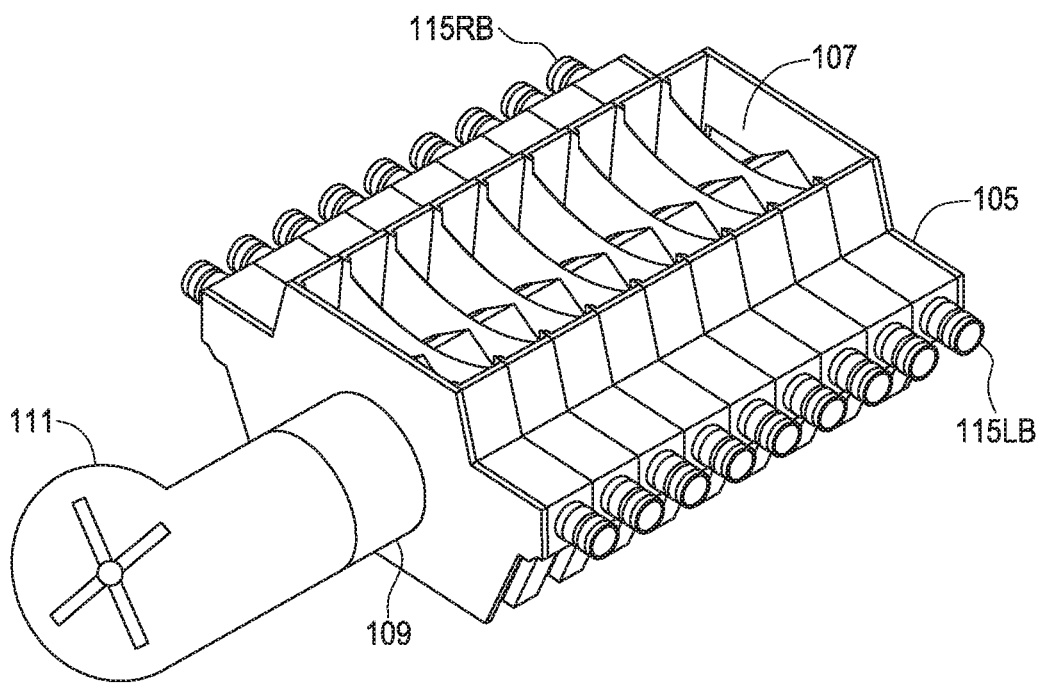
FIG. 22 is a rear perspective view of the embodiment of FIG. 19.

The illustrated inductor assembly 5 comprises, as seen in FIGS. 10 and 11, a plurality of inductor modules 5A connected together with end plates 5B, 5C at either end thereof. The number of modules 5A can be selected to correspond to the number of delivery conduits 17 that are required in any particular implement. Each module includes a substantially vertical wall 31. A middle portion of the wall 31 provides a reservoir wall 33 that extends across a lower portion of the reservoir which divides the lower portion of the reservoir 7 into segments 35. The wall 31 covers open sides of the adjacent module 5A such that, when the modules 5A are connected together, each inductor module 5A defines a portion of the reservoir 7, a portion of the right and left air conduits 9R, 9L, a portion of the right and left rod apertures 23R, 23L, one of the right pickup air openings 13R, one of the left pickup air openings 13L, one of the right seed channels 15R, one of the left seed channels 15L, one of the right bypass channels 19R, and one of the left bypass channels 19L.

One or both of the end plates 5B, 5C can comprise a portion with a translucent or transparent material 37 that allows an operator to view an interior of the inductor assembly 5 to confirm, to some extent at least, that the inductor assembly 5 is functioning as desired.

The right and left pickup air openings 13R, 13L are configured to direct the corresponding right and left pickup air streams into each reservoir segment, and each right and left seed channel inlet 15RA, 15LA is substantially aligned with one of the segments. The reservoir walls 33 serve to direct the pickup air streams PASR, PASL into the seeds in the reservoir segment 35 to pick up the seeds and form the seed air streams SASR, SASL and then direct same into the aligned right and left seed channel inlets 15RA, 15LA.

In the inductor assembly 5 shown in FIGS. 7-10 the right bypass rod 25R moves in a linear direction along the corresponding right rod channel 23R from the first bypass position to the second bypass position. FIGS. 11-13 illustrate an alternate configuration where the bypass rods 25R, 25L rotate in the corresponding right and left rod channels 23R, 23L. As illustrated the left bypass rod 25L is rotatable from a first fully open position where the bypass channels 19L are aligned with the rod apertures 27L as schematically illustrated in FIG. 12A, to a second fully closed position where the bypass channels 19L are not in alignment with the rod apertures 27L but are fully blocked by the bypass rod 25R and closed as schematically illustrated in FIG. 13A.

A rotating rod lock 39 is used to lock the bypass rods 25R, 25L in any desired position between the fully open and fully closed positions to provide a desired rate of flow of the bypass air streams BAS. The left bypass rod 25L then is movable from a first bypass position schematically illustrated in FIG. 14A, where each left bypass channel 19L is aligned to a first degree with the corresponding left rod aperture 27L allowing the left bypass air stream BASR to flow at a first rate, to a second bypass position schematically illustrated in FIG. 14B, where each left bypass channel 19L is aligned to a second lesser degree with the corresponding left rod aperture 27L allowing the left bypass air stream BASL to flow at a second rate that is less than the first rate as the effective size of the bypass channel 19L is reduced.

In the above described apparatus 1, in the bypass rods 25R, 25L as shown in FIG. 5 the right bypass channels are all substantially the same right rod aperture size and the left bypass channels are all substantially the same left rod aperture size. In a typical apparatus of the present disclosure the bypass channels 19 are all substantially the same bypass channel size and so the rate of flow of the bypass air streams BAS will be generally the same, however this rate will vary somewhat between bypass channels 19 because of varying lengths and orientations of the connected delivery conduits 17 which will cause differences in pressure between the delivery conduits 17.

In different situations and configurations of seeding implements it may be desired to have greater or lesser resistance to the flow of some of the bypass air streams BAS with respect to others by varying the effective size of some bypass channels 19 compared to others. FIGS. 15, 16, and 17 illustrate three different configurations of the bypass rods 25 where the rod apertures 27 vary in size.

In bypass rod 25A, the rod apertures 27A each have a substantially equal length L in a direction along a longitudinal axis LA of the bypass rod 25A, and wherein a width W of the rod apertures 27A in a direction perpendicular to the longitudinal axis LA of the bypass rod 25A varies. As schematically illustrated in FIG. 15A then, movement of the bypass rod 25A linearly along the corresponding rod channel to any position will expose a small portion of bypass channel 19' through the narrow rod aperture 27A', and a larger portion of bypass channel 19" through the wider rod aperture 27A". As the bypass rod 25A is moved along the rod channel to different positions, the relative proportion of the rate of flow of the bypass air stream through bypass channel 19' compared to that through bypass channel 19" will be generally constant. For example a higher airflow can be maintained for a longer delivery conduit.

Similarly in bypass rod 25B shown in FIG. 16, the rod apertures 27B each have a substantially equal width W in a direction perpendicular to the longitudinal axis LA of the bypass rod 25B, and wherein a length L of the rod apertures 27B in a direction along the longitudinal axis LA of the bypass rod 25B varies. As schematically illustrated in FIG. 16A then, movement of the bypass rod 25B linearly along the corresponding rod channel to any position will expose a small portion of bypass channel 19' through the shorter rod aperture 27B', and a larger portion of bypass channel 19" through the longer rod aperture 27B". As the bypass rod 25B is moved along the rod channel to different positions, the relative proportion of the rate of flow of the bypass air stream through bypass channel 19' compared to that through bypass channel 19" will be generally constant. For example a higher airflow can be maintained for a longer delivery conduit.

Similarly again FIG. 17 shows a bypass rod 25C' where one of the rod apertures 27C' is larger than the other rod apertures 27C such that the rate of flow of the bypass air stream BAS flowing through a corresponding bypass channel will be larger than the rate flowing through the other bypass channels.

FIG. 18 shows a bypass rod 25D that defines a plurality of clean out apertures 41 in addition to the rod apertures 27D which are of equal size. The clean out apertures 41 are larger than the rod apertures 27D, and the bypass rod 25D is movable in the linear direction from a regular bypass position shown in FIG. 18A where the bypass channels 19 are aligned to a selected degree with the rod apertures 27D to a clean out position shown in FIG. 18B where each bypass channel 19 is substantially aligned with a clean out aperture 41, and where the bypass channels 19 are completely open. The illustrated bypass rod 25D may be rotated or moved linearly to adjust the relationship between the bypass channels and the rod apertures, but is then moved linearly to the clean out position.

In the clean out position, the increased rate of flow of the bypass air streams BAS will rob air from the air conduits 9 and reduce the rate of flow of the pickup air streams PAS such that they pick up no seed. Thus the clean out position can be used to pass a clean bypass air stream through the system to cleanout delivery conduits when changing crops, or to dry delivery conduits in humid weather.

FIGS. 19-22 illustrate an alternate embodiment of an inductor apparatus 101 of the present disclosure for an agricultural seeding implement. The apparatus 101 comprises a storage container 103 for seeds, and an inductor assembly 105 mounted under the storage container 103 such that seeds 121 from the storage container 103 flow into a reservoir 107 defined by the inductor assembly 105. The inductor assembly defines an air conduit 109 extending along a middle of the reservoir 107 and a pressurized air source, schematically illustrated as a fan 111, directing a pressurized air stream into the air conduit 109.

Right and left pickup air openings 113R, 113L in corresponding right and left lower sides of the air conduit 109 are configured to direct right and left pickup air streams PASR, PASL into corresponding right and left sides of a floor 151 of the reservoir 107.

The inductor assembly 105 defines a plurality of right seed channels 115R, each right seed channel extending substantially perpendicular to the air conduit 109 and sloping upward from a right seed channel inlet 115RA located above the right pickup air opening 113R to a right seed channel outlet 115RB located in an upper right portion of the inductor assembly 105. Delivery conduits 117 are connected to the seed channel outlets 115RB, 115LB.

The inductor assembly 105 further defines a plurality of left seed channels 115L, each left seed channel extending substantially perpendicular to the air conduit 109 and sloping upward from a left seed channel inlet 115LA located above the left pickup air opening 113L to a left seed channel outlet 115LB located in an upper left portion of the inductor assembly 105.

The inductor assembly 105 further defines a right bypass channel 119R extending downward from each right seed channel 115R and through a lower right wall of the air conduit 109 below the right pickup air opening 113R. Similarly a left bypass channel 119L extends downward from each left seed channel 115L and through a lower left wall of the air conduit 109 below the left pickup air opening 113L.

In operation the right pickup air stream PASR picks up seeds 121 flowing into the reservoir 107 and forms a right seed air stream SASR entrained with seeds flowing into each right seed channel inlet 115RA and a right bypass air stream BASR flows from the air conduit 109 through the right bypass channel 119R into each right seed channel 115R and the combined right seed air streams SASR and right bypass air streams BASR flow out the right seed channel outlets 115RB, Similarly in operation the left pickup air stream PASL picks up seeds 121 flowing into the reservoir 107 and forms a left seed air stream SASL entrained with seeds flowing into each left seed channel inlet 115LA and a left bypass air stream BASL flows from the air conduit 109 through the left bypass channels 119L into each left seed channel 115L and the combined left seed air streams SASL and left bypass air streams BASL flow out the left seed channel outlets 115LB.

The reservoir 107 is divided by reservoir walls 133 into reservoir segments 135 and the right and left pickup air openings 113R, 113L are configured to direct the corresponding right and left pickup air streams PASR, PASL into each reservoir segment 135, and each right and left seed channel inlet 115RA, 115LA is substantially aligned with one of the segments 135. The reservoir walls 133 serve to direct the pickup air streams PASR, PASL into the seeds in the reservoir segment 135 to pick up the seeds and form the seed air streams SASR, SASL and then direct same into the aligned right and left seed channel inlets 115RA, 115LA.

The rate of flow of the right and left bypass air streams BASR, BASL through the corresponding right and left bypass channels 119R, 119L is adjustable.

The inductor assembly defines right and left rod channel 123R, 123L extending from an exterior of the inductor assembly 105 through the inductor assembly, and each right bypass channel 119R passes through the right rod channel 123R and each left bypass channel 119L passes through the left rod channel 123L. The right rod channel 123R is substantially parallel to the air conduit 109 and below the right pickup air opening 113R, and the left rod channel 123L is substantially parallel to the air conduit 109 and below the left pickup air opening 113L.

Figure 23:
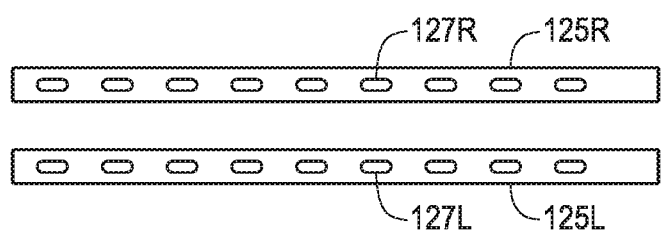
FIG. 23 is a top view of the right and left bypass rods of the embodiment of FIG. 19.

A right bypass rod 125R, as shown in FIG. 23, extends through the right rod channel 123R, and the right bypass rod defines a plurality of right rod apertures 127R. The right bypass rod 125R is configured such that the right bypass rod 125R is movable to a position where each right bypass channel 119R is substantially aligned with a right rod aperture 127R, and moving the right rod apertures 127R with respect to the right bypass channels 119R changes the rate of flow of the right bypass air streams BASR.

Similarly a left bypass rod 125L extends through the left rod channel 123L, and the left bypass rod defines a plurality of left rod apertures 127L. The left bypass rod 125L is configured such that the left bypass rod 125L is movable to a position where each left bypass channel 119L is substantially aligned with a left rod aperture 127L, and moving the left rod apertures 127L with respect to the left bypass channels 119L changes the rate of flow of the left bypass air streams BASL.

In this alternate embodiment of an inductor apparatus 101 and inductor assembly 105, the right and left bypass rods 125R, 125L are movable in the corresponding rod channels 123R, 123L to adjust the rate of flow of the corresponding right and left bypass air streams BASR, BASL in the same manner as described above for right and left bypass rods 25R, 25L moving in corresponding rod channels 23R, 23L in the inductor apparatus 1 and inductor assembly 5. The illustrated bypass rods 125 rotate in the corresponding rod channels 123 and rotating rod locks 139 are shown however the bypass rods 125 could be configured to move linearly as well, or rotate for bypass adjustment and move linearly for clean out as described above.

Figure 24:
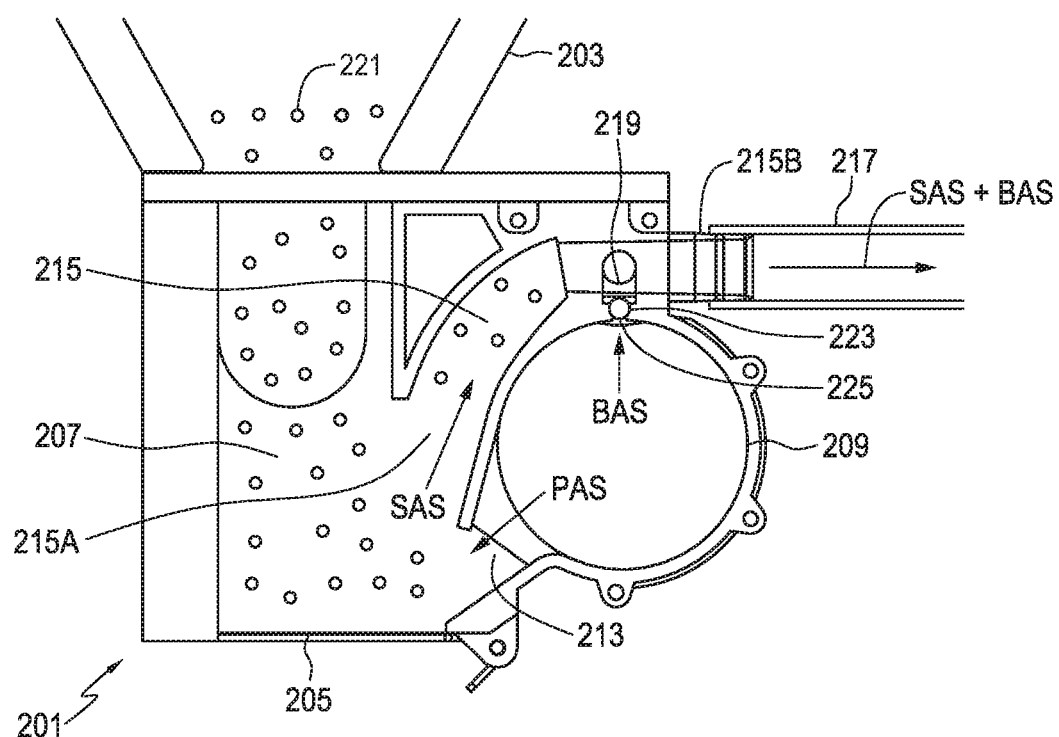
FIG. 24 is a front sectional view of a further alternate embodiment of the inductor apparatus of the present disclosure.
Figure 25:
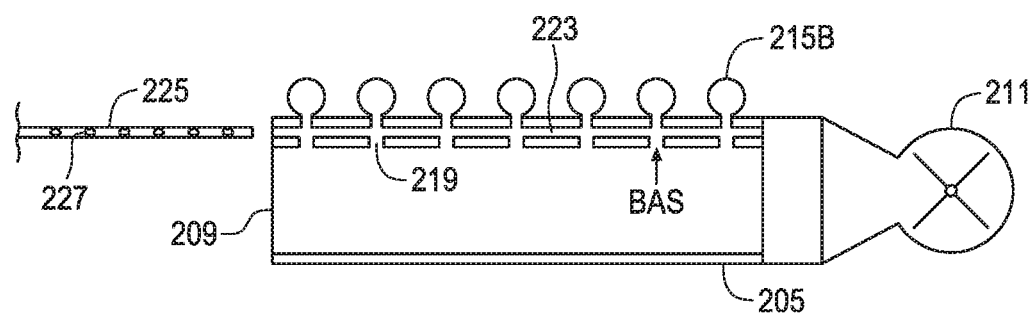
FIG. 25 is a schematic sectional side view of the embodiment of FIG. 23 with the bypass rod removed and adjacent to the inductor assembly.

FIGS. 24 and 25 show front and side sectional views of a further alternative embodiment of an inductor apparatus 201 of the present disclosure for an agricultural seeding implement. The apparatus 201 comprises a storage container 203 for seeds, and an inductor assembly 205 mounted under the storage container 203 such that seeds 221 from the storage container 203 flow into a reservoir 207 defined by the inductor assembly 205.

The inductor assembly 205 defines an air conduit 209 extending along the reservoir 207 and a pressurized air source, such as fan 211, directing a pressurized air stream into the air conduit 209. A pickup air opening 213 in the air conduit 209 is configured to direct a pickup air stream PAS into the reservoir 207. The inductor assembly 205 defines a plurality of seed channels 215, each seed channel extending across a top side of the air conduit 209 from a seed channel inlet 215A located above the pickup air opening 213 to a seed channel outlet 215B, and a bypass channel 219 extends downward from each seed channel 219 through an upper wall of the air conduit 209.

In operation the pickup air stream PAS picks up seeds 221 flowing into the reservoir 207 and forms a seed air stream SAS entrained with seeds flowing into each seed channel inlet 215A and a bypass air stream BAS flows from the air conduit 209 through each bypass channel 219 into each seed channel 215 and the combined seed air streams SAS and bypass air streams BAS flow out the seed channel outlets.

In the apparatus 201 the seed channel outlets 215B are all arranged along one side of the inductor assembly 205 such that all delivery conduits 217 extend in the same direction.

The bypass channels 219 are aligned, and the inductor assembly defines a rod channel 223 extending from an exterior of the inductor assembly 205 through the inductor assembly 205 between the air conduit 209 and the seed channels 215, and each bypass channel 219 passes through the rod channel 223.

As described above with respect to apparatuses 1 and 101, a bypass rod 225 defining a plurality of rod apertures 227 extends through the rod channel 223. FIG. 25 shows the bypass rod 225 outside the inductor assembly 205 ready to be inserted into the rod channel 223. The bypass rod 225 is configured such that the bypass rod 225 is movable to a position where each bypass channel 219 is substantially aligned with a rod aperture 227, and moving the rod apertures 227 with respect to the bypass channels 219 changes the rate of flow of the bypass air streams BAS.

The inductor apparatus 1, 101, 201 of the present disclosure provides a compact inductor assembly 5, 105, 205 with bypass channels 19, 119, 219 operative to provide bypass air streams BAS directly to the seed channels 15, 115, 215. The rate of flow of the bypass air streams BAS can be adjusted to suit various kinds of seeds, flow rates, and the like. The rate of flow of the bypass air stream BAS for any individual delivery conduit 17, 117, 217 can be adjusted to a level that is different than the rate of flow in adjacent delivery conduits The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An inductor apparatus for an agricultural seeding implement, the apparatus comprising:
    a storage container for seeds;
    an inductor assembly mounted under the storage container such that seeds from the storage container flow into a reservoir defined by the inductor assembly;
    wherein the inductor assembly defines an air conduit extending along the reservoir and a pressurized air source directing a pressurized air stream into the air conduit;
    a pickup air opening in the air conduit configured to direct a pickup air stream into the reservoir;
    wherein the inductor assembly defines a plurality of seed channels, each seed channel extending across a top side of the air conduit from a seed channel inlet located above the pickup air opening to a seed channel outlet;
    a bypass channel extending from each seed channel through an upper wall of the air conduit;
    where in operation the pickup air stream picks up seeds flowing into the reservoir and forms a seed air stream entrained with seeds flowing into each seed channel inlet and a bypass air stream flows from the air conduit through each bypass channel into each seed channel and the combined seed air streams and bypass air streams flow out the seed channel outlets;
    wherein the bypass channels are aligned, and the inductor assembly defines a rod channel extending from an exterior of the inductor assembly through the inductor assembly between the air conduit and the seed channels, and wherein each bypass channel passes through the rod channel;
    a bypass rod defining a plurality of rod apertures extends through the rod channel, the bypass rod configured such that the bypass rod is movable to a position where each bypass channel is substantially aligned with a rod aperture, and moving the rod apertures with respect to the bypass channels changes the rate of flow of the bypass air streams.

2. The apparatus of claim 1 wherein a lower portion of the reservoir is divided by reservoir walls into reservoir segments, and wherein the pickup air opening is configured to direct the pickup air stream into each reservoir segment, and wherein each seed channel inlet is substantially aligned with one of the segments.

3. The apparatus of claim 1 wherein the bypass rod is movable from a first bypass position, where each bypass channel is aligned to a first degree with the corresponding rod aperture allowing the bypass air stream to flow at a first rate, to a second bypass position, where each bypass channel is aligned to a second degree with the corresponding rod aperture allowing the bypass air stream to flow at a second rate.

4. The apparatus of claim 3 wherein the bypass rod moves in a linear direction along the rod channel from the first bypass position to the second bypass position, or rotates in the rod channel from the first bypass position to the second bypass position.

5. The apparatus of claim 1 wherein the bypass channels are all substantially the same bypass channel size and wherein:
    the rod apertures are all substantially the same rod aperture size, or
    a size of the rod apertures is unequal, such that the rate of flow of the bypass air stream varies between bypass channels.

6. The apparatus of claim 1 wherein the bypass rod further defines a plurality of clean out apertures of a size larger than the rod apertures, and wherein the bypass rod is movable to a clean out position where each bypass channel is substantially aligned with a clean out aperture.

7. An inductor apparatus for an agricultural seeding implement, the apparatus comprising:
    a storage container for seeds;
    an inductor assembly mounted under the storage container such that seeds from the storage container flow into a reservoir defined by the inductor assembly;
    wherein the inductor assembly defines an air conduit extending along a middle of the reservoir and a pressurized air source directs a pressurized air stream into the air conduit;
    right and left pickup air openings in corresponding right and left lower sides of the air conduit configured to direct right and left pickup air streams into corresponding right and left sides of a floor of the reservoir;
    wherein the inductor assembly defines a plurality of right seed channels, each right seed channel extending substantially perpendicular to the air conduit and sloping upward from a right seed channel inlet located above the right pickup air opening to a right seed channel outlet located in an upper right portion of the inductor assembly;
    wherein the inductor assembly defines a plurality of left seed channels, each left seed channel extending substantially perpendicular to the air conduit and sloping upward from a left seed channel inlet located above the left pickup air opening to a left seed channel outlet located in an upper left portion of the inductor assembly;
    a right bypass channel extending from each right seed channel and through a lower right wall of the air conduit below the right pickup air opening;
    a left bypass channel extending from each left seed channel and through a lower left wall of the air conduit below the left pickup air opening;
    where in operation the right pickup air stream picks up seeds flowing into the reservoir and forms a right seed air stream entrained with seeds flowing into each right seed channel inlet and a right bypass air stream flows from the air conduit through the right bypass channel into each right seed channel and the combined right seed air streams and right bypass air streams flow out the right seed channel outlets; and where in operation the left pickup air stream picks up seeds flowing into the reservoir and forms a left seed air stream entrained with seeds flowing into each left seed channel inlet and a left bypass air stream flows from the air conduit through the left bypass channels into each left seed channel and the combined left seed air streams and left bypass air streams flow out the left seed channel outlets;

the right bypass channels are aligned, and the inductor assembly defines a right rod channel extending from an exterior of the inductor assembly through the inductor assembly, and wherein each right bypass channel passes through the right rod channel;

a right bypass rod extends through the right rod channel, the right bypass rod defining a plurality of right rod apertures, the right bypass rod configured such that the right bypass rod is movable to a position where each right bypass channel is substantially aligned with a right rod aperture, and moving the right rod apertures with respect to the right bypass channels changes the rate of flow of the right bypass air streams;

the left bypass channels are aligned, and the inductor assembly defines a left rod channel extending from an exterior of the inductor assembly through the inductor assembly, and wherein each left bypass channel passes through the left rod channel;

a left bypass rod extends through the left rod channel, the left bypass rod defining a plurality of left rod apertures, the left bypass rod configured such that the left bypass rod is movable to a position where each left bypass channel is substantially aligned with a left rod aperture, and moving the left rod apertures with respect to the left bypass channels changes the rate of flow of the left bypass air streams.

8. The apparatus of claim 7 wherein the right bypass rod is movable from a first bypass position, where each right bypass channel is aligned to a first degree with a corresponding right rod aperture allowing the right bypass air stream to flow at a first rate, to a second bypass position, where each right bypass channel is aligned to a second degree with the corresponding right rod aperture allowing the right bypass air stream to flow at a second rate.

9. The apparatus of claim 5 wherein the right rod channel is substantially parallel to the air conduit and below the right pickup air opening, and the left rod channel is substantially parallel to the air conduit and below the left pickup air opening.

10. An inductor apparatus for an agricultural seeding implement, the apparatus comprising:

a storage container for seeds;

an inductor assembly mounted under the storage container such that seeds from the storage container flow into a reservoir defined by the inductor assembly;

wherein the inductor assembly defines an air conduit and a pressurized air source directs a pressurized air stream into the air conduit;

a pickup air opening in the air conduit configured to direct a pickup air stream into the reservoir;

wherein the inductor assembly defines a plurality of seed channels, each seed channel extending from a seed channel inlet to a seed channel outlet;

a bypass channel extending from each seed channel and through a wall of the air conduit;

wherein the bypass channels are aligned and the inductor assembly defines a rod channel extending from an exterior of the inductor assembly through the inductor assembly, and wherein each bypass channel passes through the rod channel;

where in operation the pickup air stream picks up seeds flowing into the reservoir and forms a seed air stream entrained with seeds flowing into each seed channel inlet and a bypass air stream flows from the air conduit through the bypass channel into each seed channel and the combined seed air streams and bypass air streams flow out the seed channel outlets; and wherein a bypass rod extends through the rod channel, the bypass rod defining a plurality of rod apertures, the bypass rod configured such that the bypass rod is movable to a position where each bypass channel is substantially aligned with a rod aperture, and moving the rod apertures with respect to the bypass channels changes the rate of flow of the bypass air streams.

11. The apparatus of claim 10 wherein the bypass rod is movable from a first bypass position, where each bypass channel is aligned to a first degree with a corresponding rod aperture allowing the bypass air stream to flow at a first rate, to a second bypass position, where each bypass channel is aligned to a second degree with the corresponding rod aperture allowing the bypass air stream to flow at a second rate.

12. The apparatus of claim 11 wherein the bypass rod moves in a linear direction along the rod channel from the first bypass position to the second bypass position, or rotates in the rod channel from the first bypass position to the second bypass position.

13. The apparatus of claim 10 wherein the bypass channels are all substantially the same bypass channel size and wherein:

the rod apertures are all substantially the same rod aperture size; or the rod apertures each have a substantially equal length in a direction along a longitudinal axis of the bypass rod, and wherein a width of the rod apertures in a direction perpendicular to the longitudinal axis of the bypass rod is unequal such that the rate of flow of the bypass air stream varies between bypass channels.

14. The apparatus of claim 10 wherein the bypass rod further defines a plurality of clean out apertures of a size larger than the rod apertures, and wherein the bypass rod is movable in a linear direction to a clean out position where each bypass channel is substantially aligned with a clean out aperture.

* * * * *